United States Patent
Proost et al.

(10) Patent No.: US 9,890,836 B2
(45) Date of Patent: Feb. 13, 2018

(54) SLIDING ELEMENT FOR LUBRICATED SLIDING SYSTEM

(75) Inventors: Roy Antoine Hendrikus Wilhelmus Proost, Puth (NL); Michael Hubertus Helena Meuwissen, Sittard (NL); Zhujuan Wang, Maastricht (NL)

(73) Assignee: DSM IP ASSETS B.V., Heerlen (NL)

( * ) Notice: Subject to any disclaimer, the term of this patent is extended or adjusted under 35 U.S.C. 154(b) by 868 days.

(21) Appl. No.: 14/112,397

(22) PCT Filed: Dec. 21, 2011

(86) PCT No.: PCT/EP2011/073530
§ 371 (c)(1),
(2), (4) Date: Dec. 26, 2013

(87) PCT Pub. No.: WO2012/146325
PCT Pub. Date: Nov. 1, 2012

(65) Prior Publication Data
US 2014/0106914 A1    Apr. 17, 2014

(30) Foreign Application Priority Data

Apr. 28, 2011 (EP) .................................. 11164092

(51) Int. Cl.

| | |
|---|---|
| F16H 7/18 | (2006.01) |
| C08L 77/06 | (2006.01) |
| F16H 7/08 | (2006.01) |
| C10M 149/18 | (2006.01) |
| F16C 33/20 | (2006.01) |
| C08L 77/02 | (2006.01) |
| C08K 3/00 | (2006.01) |
| C08K 3/04 | (2006.01) |
| C08K 3/34 | (2006.01) |

(52) U.S. Cl.
CPC .............. *F16H 7/08* (2013.01); *C08L 77/02* (2013.01); *C08L 77/06* (2013.01); *C10M 149/18* (2013.01); *F16C 33/201* (2013.01); *C08K 3/0033* (2013.01); *C08K 3/04* (2013.01); *C08K 3/346* (2013.01); *C08L 2205/02* (2013.01); *C10M 2217/044* (2013.01); *C10N 2230/06* (2013.01); *C10N 2240/02* (2013.01); *C10N 2240/04* (2013.01); *C10N 2240/10* (2013.01); *C10N 2250/18* (2013.01)

(58) Field of Classification Search
CPC . F16H 7/08; C10M 149/18; C10M 2217/044; C10N 2230/06; C10N 2240/02; C10N 2240/04; C10N 2240/10; C10N 2250/18; F16C 33/201; C08L 77/02; C08L 77/06; C08L 2205/02; C08K 3/0033; C08K 3/04; C08K 3/346

See application file for complete search history.

(56) References Cited

U.S. PATENT DOCUMENTS

| | | | |
|---|---|---|---|
| 2,246,086 A | 6/1941 | Austin | |
| 5,722,295 A * | 3/1998 | Sakai | F16H 55/06 264/101 |
| 5,875,865 A * | 3/1999 | Wakahara | B60K 23/0808 180/248 |
| 2002/0019497 A1* | 2/2002 | Mawatari | C08G 69/26 525/418 |
| 2002/0028889 A1* | 3/2002 | Nakamura | C08L 77/00 525/432 |
| 2007/0149329 A1 | 6/2007 | Ota et al. | |
| 2008/0194365 A1* | 8/2008 | Aken Van | F16H 7/18 474/111 |
| 2009/0149603 A1 | 6/2009 | Hartmann et al. | |
| 2012/0094102 A1* | 4/2012 | Stroeks | C08J 5/18 428/220 |
| 2012/0108124 A1* | 5/2012 | Elia | B32B 5/024 442/59 |

FOREIGN PATENT DOCUMENTS

| | | |
|---|---|---|
| CN | 1995148 | 7/2007 |
| EP | 1 158 022 | 11/2001 |

(Continued)

OTHER PUBLICATIONS

International Search Report for PCT/EP2011/073530 dated Mar. 12, 2012.

*Primary Examiner* — Callie Shosho
*Assistant Examiner* — John Freeman
(74) *Attorney, Agent, or Firm* — Nixon & Vanderhye P.C.

(57) ABSTRACT

The invention relates to a chain guide, respectively a chain tensioner for use in a lubricated sliding system, comprising a surface layer or bearing or comprising a sliding element comprising a surface layer, the surface layer being mainly made of a polymeric material containing a matrix polymer and optionally other components dispersed in said matrix polymer, wherein the matrix polymer consists of a semi-crystalline polyamide (SCPA) having a tensile modulus at 140° C. of at least 800 MPa (measured by the method according to ISO 527-1A). The invention also relates to a power train drive system comprising an engine, a transmission differential and a drive shaft system, a drive chain and a plastic component comprising a sliding element in contact with the lubricated drive chain, wherein the chain guide, the chain tensioner, respectively the sliding element has a coefficient of friction (Co F), measured in lubrication oil at 140° C. at a nominal contact pressure of 1 MPa and a speed of 1 m/s, of at most 0.07.

10 Claims, 1 Drawing Sheet

(56) References Cited

FOREIGN PATENT DOCUMENTS

Figure 1:
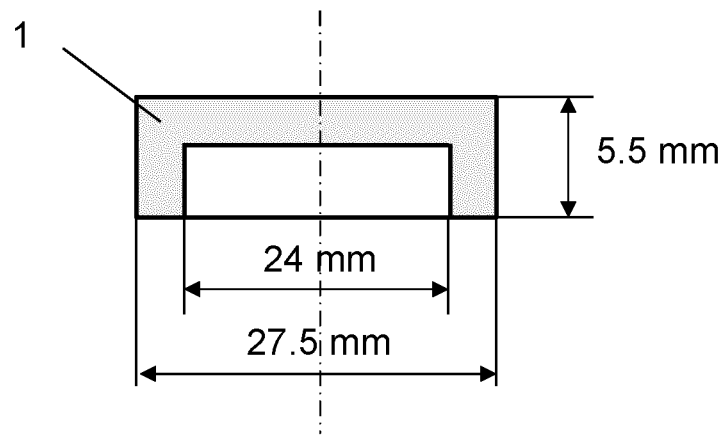

| | | |
|---|---|---|
| EP | 1 681 313 | 7/2006 |
| JP | 08-210448 | 8/1996 |
| JP | 2001-329164 | 11/2001 |
| JP | 2004-150551 | 5/2004 |
| JP | 2007-177037 | 7/2007 |
| JP | 2008-138849 | 6/2008 |
| JP | 2009-501887 | 1/2009 |
| WO | WO 2009/010487 | 1/2009 |
| WO | WO 2010/060900 | 6/2010 |
| WO | 2010/144383 | 12/2010 |

* cited by examiner

SLIDING ELEMENT FOR LUBRICATED SLIDING SYSTEM

This application is the U.S. national phase of International Application No. PCT/EP2011/073530 filed 21 Dec. 2011 which designated the U.S. and claims priority to EP 11164092.6 filed 28 Apr. 2011, the entire contents of each of which are hereby incorporated by reference.

The invention relates to a sliding element for use in a lubricated sliding system, more particular a chain transmission apparatus, such as a power train drive system comprising an engine, a transmission differential and a drive shaft system. In particular the engine is an internal combustion engine comprising a lubricated chain driven system. In such systems the sliding element is in sliding contact with the lubricated chain during practical use of the engine. These sliding components are in particular chain guides and chain tensioners.

Sliding components for chain and sliding system are described, for example, in the following patents or patent applications. US2002004433A describes a chain guide member used in a chain transmission apparatus. The chain guide member has a sliding contact section extending along a travelling surface of a chain and coming into sliding contact with the chain, and a reinforcement main body reinforcing and supporting the sliding contact section along the travelling surface of the chain. A part or all of a joint portion between the sliding contact section and the reinforcement main body is joined by melting. U.S. Pat. No. 6,524,202B describes a tensioner for use on the timing chain of a motor vehicle engine. The tensioner is referred to as a blade-type tensioner and has a blade spring element mechanically interlocked with a plastic shoe. The shoe may be of rigid filled nylon and engages the chain to be tensioned. The spring element is interlocked to the plastic shoe by having ends inserted into grooves formed in the opposite ends of the shoe. The shoe has a metal bushing fixed in one end. The shoe is rotatably attached to a metal pin inserted through the bushing, the pin being fixed to a base. FR2736123A describes a guide rail consisting of a main body and an anti-friction coating which are moulded together by a bi-component injection process so that once they have set they are fixed together. The material which forms the body is injected into the mould first, followed immediately afterwards by the coating material. The material forming the body is a plastic with reinforcing additives, for example, a polyamide reinforced with glass fibres, while the outer coating is another plastic which is resistant to abrasion. JP8210448A describes a chain guide, and chain tensioner and an auto-tensioner, endurable against tapping under a high temperature environment, excellent particularly in impact strength, abrasion and fatigue characteristic, excellent in a rigidity and sliding characteristic, excellent in durability, and excellent in heat resistance and oil resistance. US 2007/0149329 A1 describes a sliding element or sliding shoe securely fixed to a main body.

In recent years, an improvement in fuel economy or fuel consumption is required in internal combustion engines form the viewpoint of environmental protection. Nowadays there is a big concern with the energy consumption, and in particular with the $CO_2$ emissions, of personal cars and other means of transport. To enforce lower $CO_2$ emissions, governments have installed penalties, or tend to do so, for excessive $CO_2$ emissions. Limits are set on 130 g $CO_2$/km, as a typical number for a standard vehicle with a weight of 1300 kg, and will go further down from 2012 onwards. Therefore, and in particular for reasons of a more sustainable environment, there is a need for more efficient cars, and more efficient engines for use in such cars and other transport vehicles.

One of the main causes for automotive vehicles consuming much energy is energy loss due to friction. One important area of friction is in engines comprising a chain driven system, wherein components comprising a sliding element are in sliding contact with the chain during practical use of the engine.

In recent years, there has already been a lot of attention to improve the characteristics of sliding parts such as a bearing, a roller, a gear and the like from the viewpoint of reducing noise with sliding, lightening weight and providing no lubrication to a sliding section, in particular where a plastic sliding material is used in an increasingly severe environment, for example, under higher bearing pressures and higher use temperatures.

Particularly, a sliding element of a chain guide and a chain tensioner used in an internal combustion engine of an automotive vehicle are required to have good sliding characteristics, good heat resistance at a temperature of not lower than 140° C. and a good oil resistance, good fatigue and good impact properties.

Because of a good performance in heat resistance, oil resistance, mechanical strength and wear resistance, often polyamide polymers are used in the sliding components. To improve the frictional resistance of polyamide polymers during sliding, a solid lubricant is added, for example, a fluororesin, such as polytetrafluoroethylene and electron beam radiated modifications thereof, as disclosed in JP 2002/53761 A1 and US 2007/0149329 A1. The preparation of the solid lubricant of US 2007/0149329 A1 is laborious and complicated.

Additionally, it is also known to add a solid lubricant such as molybdenum disulfide into the polyamide resin. Addition of such a solid lubricant to the polyamide generally reduces the strength and impact resistance of the material. For parts like shoes of chain guides, chain tensioners and the like, a good impact and fatigue resistance is an important subject from the viewpoint of reliability of the part. A general measure to improve the impact resistance of resin compositions is to add fibres and fillers such as glass fibber or the like, or a soft material such as rubber or the like, into the resin composition, as disclosed in JP 2005 89619 A1. However, for sliding elements these are not always favourable. PTFE and impact modifiers change the stiffness and creep performance, which are also important for chain guides and tensioners. Furthermore, fibres dropped from the resin composition during sliding stay at the surface thereby serving as an abrasive. This results in wear of the resin composition itself. Additionally, the fibres scattered in a system stays in other sliding sections, thereby promoting wear of other parts.

It is therefore an aim of the present invention to provide a sliding element, such as a comprised by a chain guide or a chain tensioner, for use in a lubricated sliding system that exhibits improved sliding characteristics and reduces or solves one or more of problems of the sliding components described above. A further aim is to make transport vehicles, and power train drive systems or engine that can be used therein, more efficient in its energy consumption.

This aim has been achieved with the chain guide and the chain tensioner according to the invention, comprising a surface layer or bearing or comprising a sliding element comprising a surface layer, the surface layer being mainly made of, or eventually consisting of a polymeric material containing (A) a matrix polymer, and, optionally (B) other components dispersed in and/or blended with said matrix polymer, wherein the matrix polymer consists of a semi-crystalline polyamide having a tensile modulus, measured by the method according to ISO 527, at 140° C. of at least 800 MPa.

The purpose of the surface layer of the sliding element is to engage in slidable contact with the chain in a lubricated drive system.

The effect of the chain guide and the chain tensioner comprising the sliding element according to the invention, wherein the matrix polymer comprised by the polymeric material in the surface layer consists of a semi-crystalline polyamide (further herein also abbreviated as SCPA) having a tensile modulus at 140° C. of at least 800 MPa, is that the coefficient of friction (CoF), measured under lubricated conditions at elevated temperature is reduced and also the energy consumption of power train drive systems or engine comprising such sliding element in contact with a lubricated drive chain is reduced. This result is surprising since similar effects were not observed in dry, non-lubricated systems.

The term "matrix polymer" used is herein understood to be the main component in the composition of the polymeric material. There can be other components present in the polymeric material as well, but the amounts thereof will generally be limited, as will be discussed further below. Such further components might be dispersed in the matrix polymer, such as inorganic fillers and fibres, whereas other components, like other polymers, might be either dispersed in or blended with the matrix polymer.

The tensile modulus at 140° C. of the semi-crystalline polyamide (SCPA) in the sliding element according to the invention can vary over a wide range, and there is no reason for a maximum limitation. Practically with the tensile modulus at 140° C. in the range of 800-1050 MPa very good results are obtained. Preferably the tensile modulus at 140° C. is at least 850 MPa, more preferably at least 900 MPa and even better at least 950 MPa. With a higher tensile modulus better results are obtained.

It is noted that the tensile modulus as measured by the method according to ISO 527, at 140° C., is measured on test samples prepared from the matrix polymer applying the same process conditions as applied for the polymeric material in the sliding element. Generally, the samples are tested as injection moulded. If so applicable, the samples of the semi-crystalline polyamide (SCPA) may need to be subjected to one or more additional processing steps, for example an annealing step, wherein the matrix polymer is processed under same conditions as the polymeric material in the sliding element.

For the SCPA matrix polymer in the sliding element according to the invention, any semi-crystalline polyamide (SCPA) having a tensile modulus at 140° C. of at least 800 MPa can be used. The semi-crystalline polyamide (SCPA) may well be a blend of two or more different semi-crystalline polyamides. Suitably, the SCPA is a semi-crystalline semi-aromatic polyamide, or a semi-crystalline aliphatic polyamide, or a combination thereof. In case the semi-crystalline polyamide (SCPA) is a blend, comprising at least two different semi-crystalline polyamides, the blend may suitably consist of at least two semi-crystalline aliphatic polyamides, or at least two semi-crystalline semi-aromatic polyamides, or a combination of at least one semi-crystalline semi-aromatic polyamide and at least one semi-crystalline aliphatic polyamide.

In one preferred embodiment the SCPA comprises a semi-crystalline aliphatic polyamide (A-1), preferably having a Tg of at least 80° C. and a melting enthalpy of at least 70 J/g.

In another preferred embodiment the SCPA comprises a semi-crystalline semi-aromatic polyamide (A-2), preferably having a Tg of at least 110° C. and a melting enthalpy of at least 70 J/g.

Semi-crystalline polyamides typically have a melting temperature (Tm) and a melting enthalpy (ΔHm), as well as a glass transition temperature (Tg). For the values reported herein the glass transition temperature, the melting temperature and the melting enthalpy are measured on pre-dried samples by the method according to ISO-11357-3.2, 2009, in an $N_2$ atmosphere with heating and cooling rate of 10° C./min. Herein Tg, Tm and ΔHm are measured and calculated for the second heating curve. The first heating curve reflects mainly the thermal history of the polymeric sample i.e. as received while the second heating curve is mostly taken into account in order to characterize the intrinsic thermal properties of the polymer.

It has been observed that the glass transition temperature (Tg) does not need to be as high as the temperature at which the Coefficient of Friction is measured, but that a higher Tg in combination with a higher crystallinity, as measured directly or indirectly from the melting enthalpy, has a positive effect on the lowering of the Coefficient of Friction measured under lubricated conditions. The latter will be referred to as Coefficient of Friction-Lubricated, herein also abbreviated as CoF-L.

In a special embodiment of the present invention, the SCPA consists primarily of semi-crystalline aliphatic polyamide (A-1), and comprises a small amount wherein semi-crystalline semi-aromatic polyamide (A-2). The amount of the semi-crystalline semi-aromatic polyamide (A-2) is preferably in the range of 0.01-10 wt. %, more preferably 0.1-5 wt. %, relative to the total weight of the polymeric material.

Also preferably, the melting temperature of the semi-crystalline semi-aromatic polyamide is higher than that of the semi-crystalline aliphatic polyamide, and the melt processing temperature, i.e. the temperature of the melt at which the polymer composition is processed to injection mould the sliding element, is not higher than the melting temperature of the semi-crystalline semi-aromatic polyamide. The effect of the presence of the semi-crystalline semi-aromatic polyamide and such processing is that the CoF-L of the semi-crystalline aliphatic polyamide is increased.

To reduce the CoF-L it is advantageous that the SCPA in the sliding element is annealed at a temperature between 100° C. and 20° C., preferably between 80° C. and 30° C. below its melting temperature (Tm). Suitably, the annealing is conducted at a temperature at around 40-50° C. below its melting temperature (Tm). For the annealing step the sliding element comprising the surface layer mainly made or eventually consisting of the polymeric material is held at said temperature for at least about 1 hour. The sliding element can be kept at that temperature for longer time, for example, up to 24 hours or even longer than 24 hours. Longer annealing times might be advantageous for annealing at a relative low temperature, whereas for annealing at a relative high temperature shorter annealing times might be sufficient to already create a improvement in the CoF-L. This improvement in the friction characteristics of the sliding element under lubricated conditions upon annealing of the sliding element comprising the SCPA is surprising, since such improvement was not observed under dry, non-lubricated conditions.

The polymeric material in the sliding element according to the invention may also comprise one or more other components.

In a preferred embodiment of the invention, the polymeric material consists of
(A) 60-100 wt. % of the semi-crystalline polyamide having a tensile modulus at 140° C. of at least 800 MPa, and
(B) 40-0 wt. % of other components dispersed in and/or blended with (A).

More preferably, the polymeric material consists of
(A) 70-99.99 wt. % of the SCPA, and
(B) 30-0.01 wt. % of other components dispersed in and/or blended with (A).

Still more preferably, the polymeric material consists of
(A) 80-99.9 wt. % of the SCPA, and
(B) 20-0.1 wt. % of other components dispersed in and/or blended with (A).

Suitably the polymeric material comprises at least one other component (B), selected from the following groups and preferably present in amounts as indicated further below:
a. polymers other than semi-crystalline polyamide;
b. solid inorganic lubricant particles;
c. inorganic nucleating agent;
d. inorganic fillers and/or fibrous reinforcing agents; and/or
e. other auxiliary additives.

For the polymers of Component (B.a) that can be combined with the SCPA in principle any thermoplastic or thermoset polymer other than the semi-crystalline polyamide (SCPA) may be used as long as these polymers are used in a restricted amount such that the high temperature modulus is not effected or only in limited extent. Suitably the amount is limited to a range of, example, 0.01-20 wt. %. Practically, if used at all, the amount is limited to a range of 1-15 wt. %, or even 2-10 wt. %. In a particular embodiment, the other polymer may comprise, or consist of solid fluororesins. These resins can act as a solid lubricant. An example of such a fluororesin is PTFE, which, when used, is suitably present in an amount of 1-20 wt. %, preferably 5-15 wt. %.

The solid inorganic lubricant particles (Component (B.b)) suitably comprise a material chosen from the group consisting of molybdenum disulfide, graphite, boron nitride and silane nitride, and any mixtures thereof. The solid inorganic lubricant particles can be present in an amount in the range of, for example, 0.01-20 wt. %, although higher amounts may also be used. Practically, if solid lubricants are used at all, the amount is limited to a range of 1-15 wt. %, or even 2-10 wt. %.

Advantageously the polymeric material in the sliding element according to the invention comprises an inorganic nucleating agent (Component (B.c)). The inorganic nucleating agent may be present in an amount which appropriately is in the range of 0.01-5 wt. % relative to the total weight of the polymeric material. Examples of suitable nucleating agents are micro-talc and carbon black for both a semi-crystalline semi-aromatic polyamide and a semi-crystalline aliphatic polyamide as the SCPA.

For the inorganic fillers and/or fibrous reinforcing agents (Component (B.d)) any inorganic material, other than the solid inorganic lubricants mentioned above, that improves the mechanical properties, such as tensile strength and modulus, may be used. However, since many of these materials can have a negative effect on the wear properties, the amount thereof, if used at all, should preferably be kept limited. Suitably the amount is in the range of, example, 0.01-20 wt. %. Preferably, if used at all, the amount is limited to a range of 1-15 wt. %, or even 2-10 wt. %.

The composition may also comprise other additives (Component (B.e)). These additives may be chosen from auxiliary additives, generally used in plastic materials for gliding elements. Such other additives are typically used in restricted amounts, for example in the range of 0.01-20 wt. %. Suitably, if used at all, the amount is limited to a range of 1-15 wt. %, or even 2-10 wt. %.

It is noted that the weight percentages (wt. %) referred to herein above for the various components B.a-e, unless specified otherwise, are all relative to the total weight of the polymeric material. Furthermore, anywhere any of the components B.a-e present in the polymeric material consists of a mixture of multiple components, the weight percentages (wt. %) refer to the total amount of the multiple components within the same component category.

In a preferred embodiment of the invention, the polymeric material in the surface layer comprises at least one other component, selected from one or more of the following groups and present in the indicated amounts:
(B.a) 0.01-20 wt. % of polymers other than semi-crystalline polyamide (SCPA)
(B.b) 0.01-20 wt. % of solid lubricant particles comprising a material chosen from the group consisting of molybdenum disulfide, graphite, boron nitride and silane nitride, and any mixtures thereof;
(B.c) 0.01-5 wt. % of an inorganic nucleating agent comprising micro-talc and/or carbon black;
(B.d) 0.01-10 wt. % of inorganic fillers other than (B.b) and (B.c) and/or fibrous reinforcing agents; and/or
(B.e) 0.01-10 wt. % of other (auxiliary) additives.

In a particular embodiment of the present invention, the sliding component, being either a chain guide or a chain tensioner, comprises a plastic body supporting the surface layer or the sliding element comprising the surface layer, wherein the plastic body and the surface layer are made from different polymeric materials. Suitably, the surface layer has a thickness in the range of 50 μm-5 mm, although the surface layer may also be thicker than 5 mm, or be thinner than 50 μm.

For mechanical properties, it is advantageous to design the sliding component such that the plastic body consists of a fibre reinforced thermoplastic material and the sliding element or surface layer consists of a non-reinforced thermoplastic material.

Depending on the choice of matrix polymer, optional annealing thereof, the presence of nucleating agents and other components, the sliding element according to the invention has a coefficient of friction (CoF), measured in lubrication oil at 140° C. at a nominal contact pressure of 1 MPa and a sliding speed of 1 m/s, in the range of 0.005-0.07. Preferably, the CoF-L is in the range of 0.005-0.05.

The sliding element according to the invention and any preferred embodiment thereof, is a part of a chain guide or a chain tensioner.

The invention also relates to the use of the chain guide, respectively the chain tensioner, comprising the surface layer or bearing or comprising the sliding element comprising the surface layer according to the invention in a lubricated sliding system. The lubricated sliding system suitably is a power train drive system comprising an engine, a transmission differential and a drive shaft system.

The invention also relates to a power train drive system comprising an engine, a transmission differential and a drive shaft system, a drive chain and a plastic component comprising a sliding element in contact with the lubricated drive chain, wherein the sliding element has a coefficient of friction (CoF), measured in lubrication oil at 140° C. at a nominal contact pressure of 1 MPa and a sliding speed of 1 m/s, of at most 0.07. Preferably, the sliding element in the power train drive system is a sliding element according to the invention or any preferred embodiment thereof, as described herein further above.

The invention is further illustrated with the following examples and comparative experiments.

Materials

PA-6 polyamide-6, Akulon F223-DH, an aliphatic polyamide from DSM

PA-66 polyamide-66, Akulon F223-DH, an aliphatic polyamide from DSM

PA-46 polyamide-46, Stanyl TW 300 an aliphatic polyamide from DSM

PPA polyamide-6T/4T/66; a semi-aromatic copolyamide from DSM

Methods

Injection Moulding

The polyamides reported herein below used for making injection moulded test parts were pre-dried prior to use, by applying the following conditions: the copolyamides were heated under vacuum of 0.02 MPa to 80° C. and kept at that temperature and pressure for 24 hrs while a stream of nitrogen was passed. The pre-dried materials were injection moulded on an injection moulding machine with a mould for making ISO 527-1A test bars. The temperature of the cylinder wall was set at 30° C. above the melting temperature of the polyamide and the temperature of the mould was set at 140° C. The ISO 527-1A test bars thus obtained were cooled and stored under dry conditions at room temperature, and used lateron for the mechanical tests.

In the same way cups used in the friction test were injection moulded from the respective plastic materials, using a mould with a cavity providing for the cup design described further below.

Annealing

Some ISO 527-1A test bars obtained by injection moulding as described above, were annealed for 128 hours in a nitrogen atmosphere at a temperature of 240° C., which is 50° C. below the melting temperature of the polyamide.

Mechanical Properties

The tensile modulus [MPa]) was measured in a tensile test according to ISO 527 at 140° C., using the ISO 527-1A test bars obtained by injection moulding, optionally combined with annealing, as described above.

Measurement of Thermal Transition Properties: Tg, Tm and ΔHm

For the measurements of the melting temperature samples of about 5 mg pre-dried powdered polymer were used. The pre-drying was carried out at high vacuum, i.e. less than 50 mbar, at 105° C. during 24 hrs.

The glass transition temperature (Tg), the melting temperature (Tm), and the melting enthalpy (ΔHm) were measured by the method according to according to ISO-11357-3.2, 2009. The actual measurements were carried out on a heat flux DSC instrument calibrated according to ISO-11357, 2009. An aluminum crucible filled with the polyamide sample and a comparable empty crucible, both covered with a pierced lid, were heated in the DSC instrument with a heating rate of 10° C./min. The instrument was purged with a controlled nitrogen flow (50 ml/min). The sample was heated from −30° C. to a temperature about 30° C. above the melting temperature with a heating rate of 10° C./min. The polyamide sample was immediately cooled to −30° C. with a cooling rate of 10° C./min, and subsequently heated again to about 30° C. above the melting temperature at 10° C./min. The first heating curve, cooling curve and second heating curve were recorded and stored. For the glass transition temperature (Tg), the melting temperature (Tm), and the melting enthalpy (ΔHm) the second heating cycle was used.

Friction Test

Figure 2:
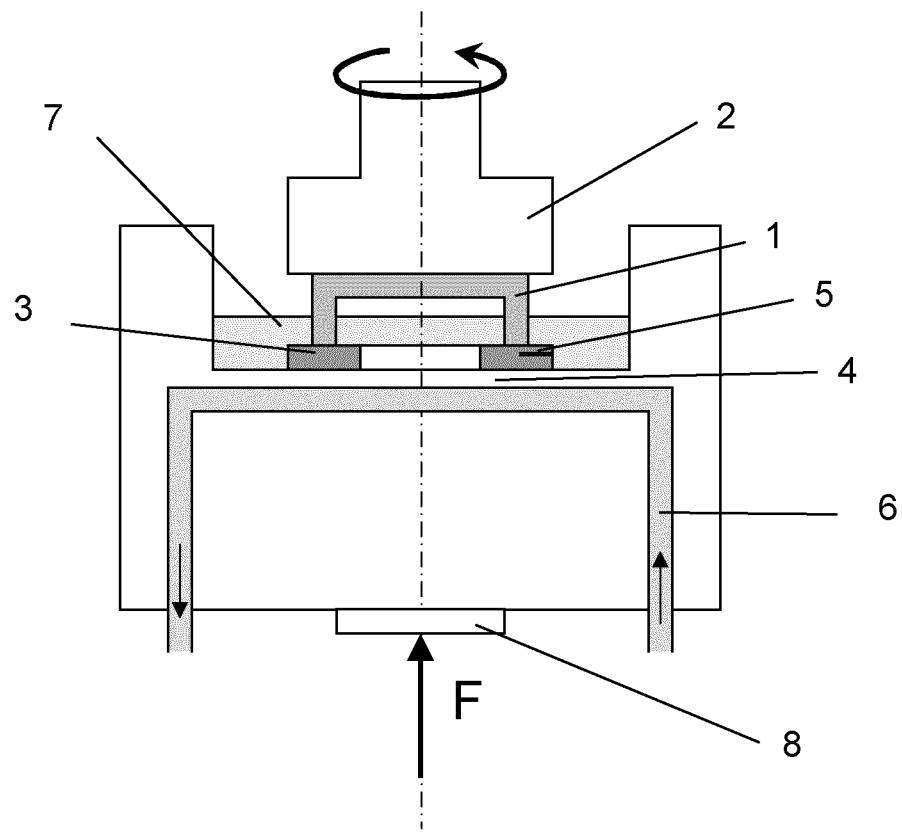

The friction test was done with a cylindrically symmetrical plastic cup as shown in FIG. 1, using a set-up as shown in FIG. 2.

FIGURES

FIG. 1: cross sectional view of a cylindrically symmetrical plastic cup as used in the friction test.

FIG. 2: Schematic view of the friction test set-up.

FIG. 1 shows a cross section through the central axis of a cylindrically symmetrical plastic cup (1) as used in the friction test. The cup has an inner diameter of 24 mm, an outer diameter of 27.5 mm, and a height of 5 mm, as indicated in FIG. 1.

The cups used in the friction test were injection moulded from the respective plastic materials.

The friction test set-up is shown in FIG. 2. The plastic cup (1) is installed in an upper specimen holder (2) of the testing machine (not shown). An SKF WS 81104 shaft washer (3), which is used as the steel counter surface, is mounted on a lower specimen holder (4). The washer has an inner diameter of 20 mm, an outer diameter of 35 mm, and a height of 2.75 mm. It has a hardness of 60 on the Rockwell-C scale (60 HRc) and an average surface roughness (Ra) of 2 μm. A hole (5) is machined 0.5 mm below the contact surface to mount a thermo-couple for temperature logging. Heating oil (Shell Helix Super Mineral Motor Oil 15W-40) is circulated through a channel (6). The washer was provided with a thermocouple, positioned 0.5 mm underneath the contact surface between the washer and the cup. The oil (6) is used to keep the contact temperature, as measured by the thermocouple, at 140° C. The washer and the lower part of the cup are submerged in a testing oil (7) (Nissan Motor Oil Strong Save-X 5W-30 SM KLAM3-05304).

Contact normal pressure is applied by a force F on the lower specimen holder (4). The nominal contact pressure was 1 MPa, respectively 5 MPa. The upper specimen holder (2) rotates at an angular velocity of 742 rpm corresponding with a sliding velocity of 1 m/s at the contact surface. This sliding velocity is the sliding velocity calculated for the centre of the cup wall, which also corresponds with the average sliding velocity calculated over the wall thickness. The friction torque T is measured by a load cell (8). The coefficient of friction was calculated from the ratio T/F.

Materials and Test Results

The materials used in the test, the thermal and mechanical properties and the tests results have been collected in table 1.

TABLE 1

Materials and test results

| Material | Tg (°C.) | Tm (°C.) | ΔHm (J/g) | Modulus at 140° C. [MPa] | CoF [—] at NCP of 1 MPa | CoF [—] at NCP of 5 MPa |
|---|---|---|---|---|---|---|
| PA6 | 55 | 225 | ~70 | | | 0.145 |
| PA66 | 60 | 265 | 80 | 400 | 0.13 | 0.075 |
| PA46 | 80 | 290 | 80 | 700 | 0.09 | 0.06 |
| PA46 annealed | | | | 930 | 0.05 | 0.07 |
| PA46/PPA blend (97.5/2.5 wt. %) | 120 | 325 | 85 | 950 | 0.01 | 0.05 |

NCP = nominal contact pressure

The invention claimed is:

1. A chain guide or chain tensioner for use in a lubricated sliding system, wherein the chain guide or chain tensioner comprises:
   a sliding element which includes (i) a plastic body supporting the sliding element, and (ii) a surface layer on the plastic body having a thickness in a range of 50 μm-5 mm, wherein
   the plastic body and the surface layer are formed of different injection molded polymeric materials, and wherein
   the injection molded polymeric material forming the surface layer comprises:
   (A) a matrix polymer which consists of a semi-crystalline polyamide (SCPA) having a tensile modulus at 140° C. of at least 800 MPa (measured by the method according to ISO 527-1A) and, optionally,
   (B) other components dispersed in and/or blended with said matrix polymer, wherein
   the SCPA comprises:
   (A.1) a semi-crystalline aliphatic polyamide, and
   (A.2) 0.01-10 wt. % relative to the total weight of the polymeric material of a semi-crystalline semi-aromatic polyamide having a Tg of at least 110° C. and a melting enthalpy of at least 70 J/g.

2. The chain guide or chain tensioner according to claim 1, wherein the SCPA has a tensile modulus at 140° C. which is in a range of 850-1050 MPa.

3. The chain guide or chain tensioner according to claim 1, wherein the semi-crystalline aliphatic polyamide (A.1) has a glass transition temperature (Tg) of at least 80° C. and a melting enthalpy (ΔH) of at least 70 J/g.

4. The chain guide or chain tensioner according to claim 1, wherein the SCPA has a melting temperature (Tm) and the sliding element has been annealed at a temperature between 100 and 20° C. below Tm for at least 1 hour.

5. The chain guide or chain tensioner according to claim 1, wherein the injection molded polymeric material comprises at least one other component selected from the group consisting of:
   (B.a) 0.01-20 wt. % of polymers other than the semi-crystalline polyamide;
   (B.b) 0.01-20 wt. % of solid lubricant particles comprising a material chosen from the group consisting of molybdenum disulfide, graphite, boron nitride and silane nitride, and any mixtures thereof;
   (B.c) 0.01-5 wt. % of an inorganic nucleating agent comprising micro-talc and/or carbon black; and
   (B.d) 0.01-10 wt. % of inorganic fillers other than (B.b) and (B.c) and/or fibrous reinforcing agents; wherein the wt. % are all relative to the total weight of the polymeric material.

6. The chain guide or chain tensioner according to claim 1, wherein the plastic body of the sliding element consists of a fibre reinforced thermoplastic material and wherein the surface layer of the sliding element consists of the injection molded polymeric material which is non-reinforced.

7. The chain guide or chain tensioner according to claim 1, wherein the sliding element has a coefficient of friction (CoF) in a range of 0.005-0.07 as measured in lubrication oil Shell Helix Super Mineral Motor Oil 15W-40 at a contact temperature of 140° C., a nominal contact pressure of 1 MPa and a sliding speed of 1 m/s.

8. A lubricated sliding system comprising a power train drive system which includes an engine, a transmission differential, a drive shaft system and the chain guide or chain tensioner according to claim 1.

9. A power train drive system comprising:
   an engine,
   a transmission differential,
   a drive shaft system,
   a drive chain, and
   a sliding element comprising (i) a plastic body supporting the sliding element, and (ii) a surface layer on the plastic body having a thickness in a range of 50 μm-5 mm in sliding contact with a lubricated drive chain, wherein
   the sliding element has a coefficient of friction (CoF) of at most 0.07 as measured in lubrication oil Shell Helix Super Mineral Motor Oil 15W-40 at a contact temperature of 140° C., a nominal contact pressure of 1 MPa and a sliding speed of 1 m/s, and wherein
   the surface layer of the sliding element being comprised of an injection molded matrix polymer which consists of a semi-crystalline polyamide (SCPA) having a tensile modulus at 140° C. of at least 800 MPa (measured by the method according to ISO 527-1A), wherein the SCPA comprises:
   (A.1) a semi-crystalline aliphatic polyamide, and
   (A.2) 0.01-10 wt. %, relative to the total weight of the matrix polymer, of a semi-crystalline semi-aromatic polyamide having a Tg of at least 110° C. and a melting enthalpy of at least 70 J/g, and wherein
   the plastic body is formed of an injection molded polymeric material which is different from the injection molded matrix polymer of the surface layer.

10. The power train drive system according to claim 9, further comprising a chain guide or chain tensioner which includes the sliding element.

* * * * *